United States Patent [19]  [11] 4,321,304
Castellucci  [45] Mar. 23, 1982

[54] BETA-DIKETONE-EPOXY RESIN REACTION PRODUCTS BLENDED WITH MONOMERIC OR POLYMERIC PHOSPHONIUM SALTS USEFUL FOR PROVIDING CORROSION RESISTANCE

[75] Inventor: Nicholas T. Castellucci, Pittsburgh, Pa.

[73] Assignee: PPG Industries, Inc., Pittsburgh, Pa.

[21] Appl. No.: 193,047

[22] Filed: Oct. 2, 1980

[51] Int. Cl.³ .................... B32B 15/08; B05D 3/02; C08J 3/08; C25D 13/06

[52] U.S. Cl. .................... 428/418; 204/181 C; 427/386; 427/388.2; 427/388.3; 427/388.4; 428/416; 428/425.8; 428/458; 428/460; 528/106; 528/107; 528/121; 528/220; 528/226; 528/229; 528/250; 523/402; 523/414; 523/451; 525/153; 525/523

[58] Field of Search .................... 204/181 C; 528/106, 528/107, 220, 226, 250, 229, 121, 93, 89, 90; 427/386, 388.1, 388.2, 388.4, 388.3; 260/29.2 EP; 428/418, 416, 457, 413, 458, 460, 425.8

[56] References Cited

U.S. PATENT DOCUMENTS

| | | | |
|---|---|---|---|
| 2,739,972 | 3/1956 | Abbott | 528/250 X |
| 3,600,406 | 8/1971 | Touval | 528/220 X |
| 3,894,922 | 7/1975 | Bosso et al. | 204/181 |
| 3,959,106 | 5/1976 | Bosso et al. | 204/181 |
| 3,962,165 | 6/1976 | Bosso et al. | 260/29.2 EP |
| 4,001,156 | 1/1977 | Bosso et al. | 260/29.2 EP |
| 4,053,329 | 10/1977 | Castellucci et al. | 148/6.15 R |
| 4,172,193 | 10/1979 | Marx et al. | 528/107 X |
| 4,260,727 | 4/1981 | Floyd | 528/121 |
| 4,284,753 | 8/1981 | Hewitt, Jr. | 528/93 X |
| 4,285,789 | 8/1981 | Kobayashi et al. | 204/181 C |

OTHER PUBLICATIONS

Horner, L., Inhibitors of Corrosion of Iron: Their Mode of Action, Electronic and Structural Prerequesites, Chemiker-Zeitung 100 (6), pp. 247–262, (1976).

Primary Examiner—Michael R. Lusignan
Assistant Examiner—Thurman K. Page
Attorney, Agent, or Firm—Godfried R. Akorli; William J. Uhl

[57] ABSTRACT

Novel compositions of matter comprising the reaction product of beta-diketones and epoxy resins blended with monomeric or polymeric phosphonium salts are hereby provided. The beta-diketones useful herein are those which enolize in amounts that render them sufficiently acidic and reactable with epoxy groups of the resin. The novel reaction products can be dispersed in water to form pretreatment agents and they can be formulated with curing agents to form coating compositions. Ferrous metals treated with the compositions of this invention exhibit excellent corrosion resistance properties.

18 Claims, No Drawings

BETA-DIKETONE-EPOXY RESIN REACTION PRODUCTS BLENDED WITH MONOMERIC OR POLYMERIC PHOSPHONIUM SALTS USEFUL FOR PROVIDING CORROSION RESISTANCE

BACKGROUND OF THE INVENTION

1. Field of the Invention

The present invention relates to treating metallic substrates, particularly ferrous metal substrates, so as to impart corrosion resistance thereto.

2. Brief Description of the Prior Art

It is well known in the art that chromic acid and phosphating pretreatments can be used to impart corrosion resistance to substrates. Examples of these pretreatments are the phosphating treatments which include iron phosphating, mixed iron and calcium phosphating and zinc phosphating. Such pretreatments may optionally be followed by a chromic acid rinse. The pretreatment operations, although employed on many industrial electrodeposition lines, are undesirable for a number of reasons. First of all, pretreatments are expensive. Besides the cost of the chemicals themselves, a considerable capital investment is required for equipment. In addition, pretreatments cause pollution problems, the solutions of which add to their expense. Also known in the art are onium salts of monomers and polymers which can be used to pretreat metallic substrates to impart corrosion resistance.

The present invention relates to the reaction products of a beta-diketone and an epoxy material which are blended with monomeric or polymeric phosphonium salts. The products are useful for the preparation of compositions which impart excellent corrosion resistance properties to substrates treated therewith.

Reference is hereby made to commonly assigned Ser. No. 193,046, filed even date herewith entitled "Beta-Diketone-Epoxy Resin Reaction Products Useful for Providing Corrosion Resistance".

SUMMARY OF THE INVENTION

In accordance with the foregoing, the present invention encompasses a novel water-dispersible composition of matter comprising a blend of:
(A) the reaction product of:
 (i) an epoxy material, and
 (ii) a beta-diketone of the formula:

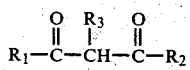

wherein $R_1$, $R_2$ and $R_3$, each independently, is a hydrogen or a hydrocarbyl group preferably containing from about 1 to about 18 carbon atoms, selected from the group consisting of alkyl or aryl,
 (iii) an onium salt precursor which is an acid salt of a tertiary amine, a tertiary phosphine-acid mixture or a sulfide-acid mixture; and
(B) at least 2 percent by weight, based on the total weight of (i) and (ii), of a monomeric or polymeric phosphonium salt which is different from (A).

It is recognized that when $R_1$ or $R_2$, each independently, is a hydrogen, the compound according to the afore-described structure would be a ketoaldehyde or a dialdehyde which could be as useful as the beta-diketone in preparing the instant novel compositions of matter. The carboxyl hydrogen of the aldehyde, particularly the dialdehyde, is, however, highly reactive and may, for that matter, be less desirable. Should that reactivity be made manageable, the aldehydes would be well suited for the present invention.

The term "hydrocarbyl group" as used herein denotes both unsubstituted and substituted hydrocarbons, provided that the substituent does not adversely affect the reactions of the beta-diketones or the use of their reaction products.

The term "beta-diketone" as used herein is, therefore, intended generically to classify the reacting compounds of the present invention in accordance with the afore-described structural formula. Severally, these compounds are also referred to herein as aldehydes and ketones. Consonant therewith, the beta-diketones that are useful herein are those which enolize in amounts that render them sufficiently acidic and reactable with the epoxy materials.

The methods of using the blends to provide improved corrosion resistance to ferrous metal substrates are also encompassed by the present invention; particularly preferred is the method of electrodeposition.

The method of providing improved corrosion resistance to a metal, particularly a ferrous metal substrate, comprises the steps of:
(A) applying to the surface of the substrate an aqueous dispersion containing the blend of:
 (i) the reaction product of:
  (a) an epoxy material;
  (b) a beta-diketone of the formula:

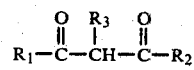

wherein $R_1$, $R_2$ and $R_3$, each independently, is a hydrogen or a hydrocarbyl group preferably containing from about 1 to about 18 carbon atoms; the hydrocarbyl group preferred herein is alkyl or aryl; and
  (c) an onium salt precursor which is an acid salt of a tertiary amine, a tertiary phosphine-acid mixture, or a sulfide-acid mixture; with
 (ii) at least 2 percent by weight, based on the total weight of (a) and (b), of a monomeric or polymeric phosphonium salt which is different from (i), followed by
(B) directly coating the surface with a coating material.

It has been found that the novel compositions can be formulated optionally with curing agents to provide compositions with improved properties. Films obtained therefrom are corrosion and solvent resistant; they are hard and possess good appearance and substrate adhesion.

The metal substrates obtained by methods of this invention are also hereby encompassed.

DETAILED DESCRIPTION

The novel compositions of this invention can be prepared by forming a water-dispersible reaction product of an epoxy resin and a beta-diketone and blending with a monomeric or polymeric phosphonium salt, in a manner which is set forth more fully hereinafter.

The epoxy resins may be of any resin class containing at least one 1,2-epoxy group. The resin may be, for example, among the general classes commonly referred to as polyethers, polyesters, acrylic, urethane and the like. Although monoepoxides such as phenyl glycidyl ether, n-butyl glycidyl ether and the like can be utilized, it is preferred that the epoxy material contain more than one 1,2-epoxy group per molecule, i.e., polyepoxide. Examples of suitable polyepoxides are described in U.S. Pat. Nos. 2,467,171; 2,615,007; 2,716,123; 3,030,336; 3,053,855 and 3,075,999.

Particularly preferred polyepoxides are polyglycidyl ethers of cyclic polyols, particularly polyphenols such as bisphenol A. These may be produced by etherification of a cyclic polyol with epichlorohydrin or dichlorohydrin in the presence of alkali. Examples of cyclic polyols are bis(4-hydroxyphenyl)-2,2-propane, 4,4'-dihydroxybenzophenone, bis(4-hydroxyphenyl)-1,1-isobutane, bis(4-hydroxytertiarybutylphenyl)-2,2-propane, bis(2-hydroxynaphthyl)methane, 1,5-hydroxynaphthalene or the like. Also, polyepoxides similarly produced from epichlorohydrin and novolak-type phenol resins may be employed.

Also preferred are the acrylic polymers containing epoxy groups. Preferably, these acrylic polymers are polymers formed by copolymerizing an alpha,beta-unsaturated epoxy-containing monomer, such as, for example, glycidyl acrylate or methacrylate with other copolymerizable alpha,beta-ethylenically unsaturated monomers.

Any polymerizable monomeric compound containing at least one $CH_2=C<$ group, preferably in terminal position, may be polymerized with the unsaturated glycidyl compounds. Examples of such monomers include:

1. monoolefinic and diolefinic hydrocarbons;
2. halogenated monoolefinic and diolefinic hydrocarbons;
3. esters of organic and inorganic acids;
4. organic nitriles.

The acrylic polymers, their method of preparation and the copolymerizable monomers are known in the art. Examples thereof are disclosed by U.S. Pat. No. 3,928,156, column 4, line 40, through column 6, line 68, which is herein incorporated by reference.

As set forth hereinbefore, the beta-diketones that are useful in this invention are those which enolize in amounts that are sufficient to render them acidic and reactable with the epoxy material component. The preferred beta-diketones have a percent of enolization of about 40 percent or higher. In accordance with the afore-described formula, the following are specific but non-limiting examples of the beta-diketones which are useful herein.

When either $R_1$ or $R_2$ is hydrogen, the beta-diketones useful herein are preferably 3-keto-1-butanol, 3-keto-1-hexanol and 3-keto-1-pentanol.

When $R_1$ and $R_2$, each independently, is alkyl such as methyl, ethyl, propyl, butyl, pentyl and higher alkyl groups such as decyl, hexadecyl or the like, the beta-diketones useful herein are preferably 2,4-pentanedione; 2,4-hexanedione; 2,4-heptanedione; 5-methyl-2,4-hexanedione; 1-cyclohexyl-1,3-butanedione; and 5,5-dimethyl-1,3-cyclohexanedione.

When $R_1$ and $R_2$, each independently, is an aryl group such as phenyl, naphthyl, anthracyl, diphenyl or the like, the beta-diketones useful herein are preferably 1-phenyl-1,3-butanedione; 1-(4-biphenyl)-1,3-butanedione; and 1-phenyl-5,5-dimethyl-2,4-hexanedione.

$R_1$ and $R_2$ each may be a member of a heterocycle; it is preferred that the hetero-atom is not directly attached to the carbonyl carbon. Beta-diketones such as 1-(2-furyl)-1,3-butanedione and 1-(tetrahydro-2-furyl)-1,3-butanedione are illustrative of this group of beta-diketones.

$R_3$ is more preferably a hydrogen or a lower alkyl such as methyl, ethyl, and the like; hydrogen is particularly preferred.

Typically the beta-diketones having a percent of enolization of about 40 to about 99 are particularly preferred. Accordingly, 1-phenyl-1,3-butanedione is very highly preferred. Others such as 2,4-pentanedione, 3-keto butyraldehyde and propane dialdehyde possess a high degree of enolization and would, therefore, be preferred.

In preparing the novel reaction product, the afore-described beta-diketones and the epoxy material are reacted, preferably in an equivalent ratio of about 0.1 to about 0.6, more preferably in an equivalent ratio of about 0.35 to about 0.45 of the beta-diketone to an equivalent of the epoxy material, in the presence of a catalyst. Catalysts such as phosphonium salts, for example, ethyl triphenyl phosphonium acetate, ethyl triphenyl phosphonium iodide and tetrabutyl phosphonium acetate are used in the preparation of the novel composition of the present invention. The amount of catalysts ranges from about 0.1 to about 2 percent based on total weight of the reactants. A solvent is not necessary in this reaction even though one is often used in order to afford better control of the reaction. Solvents which are used in this reaction should be such as would not interfere with the enolization of the beta-diketone. The reaction is carried out over a time and temperature range which will not adversely affect the enolization of the beta-diketones. Preferably, the reaction is conducted over the temperature range of 100° to 160° C. for about 1 to 4 hours; the time and temperature, of course, depend on one another and on the specific reactants, catalysts and other reaction conditions.

Water-solubilizing groups are used to make the novel reaction products water-dispersible. The preferred water-solubilizing groups are precursors of cationic groups. Preferably, the cationic groups useful herein are onium groups such as quaternary ammonium, phosphonium, or ternary sulfonium salts. An onium salt can be prepared by reacting the novel composition of this invention with an onium salt precursor. By the term "onium salt precursor" herein is meant a tertiary amine-acid salt, a tertiary phosphine-acid mixture or sulfide-acid mixture. U.S. Pat. Nos. 3,962,165; 3,894,922; 3,959,106 and 3,937,679 which are herein incorporated by reference, more fully describe the onium salt precursors useful in the present invention. Also, quaternary ammonium hydroxide containing reaction products can be used. Formation of quaternary ammonium hydroxide is described in U.S. Pat. No. 4,081,341.

In preparing the onium salt, the epoxy-beta-diketone reaction product is prepared with residual epoxy groups in amounts which are reactable with the onium salt precursor to form the onium salts in amounts sufficient to form a stable aqueous dispersion. By "stable" is meant the dispersion will not sediment at room temperature after standing for 24 hours. However, if some sediment does form which can be redispersed with low shear mixing, this also is considered to be a stable aqueous dispersion. The reaction of the onium salt precursor with the reacting novel composition of matter is essentially the same as the onium salt formation reactions described in the aforementioned U.S. patents which have been incorporated by reference.

The amount of onium salt precursor which is reacted with the novel composition can be reckoned from the amount of the starting beta-diketone and epoxy material. Accordingly, the equivalent ratio of the epoxy material to the beta-diketone to the onium salt precursor is preferably 1.0/0.1–0.6/0.4–0.9; more preferably the equivalent ratio is 1.0/0.35–0.45/0.55–0.65.

Even though the above-described reaction scheme for the formation of the onium salt of the novel compositions is preferred, it is, however, believed that alternate schemes could be effectively adopted.

In other embodiments, the water-solubilizing groups are amine salts such as secondary or tertiary amine salts. They can be prepared by reacting the novel compositions of matter with primary or secondary amine followed by at least partially acid neutralizing the reacton product. Examples of amines are mono- and dialkylamines such as ethylamine or ethylmethylamine or diethylamine, as well as hydroxyalkylamines such as diethanolamine. Examples of acids are organic and inorganic acids such as lactic acid, acetic acid and phosphoric acid.

The reaction products described above are blended or admixed with monomeric or polymeric phosphonium salts. These phosphonium salts are different from the phosphonium salts of the water-solubilizing onium salts. The phosphonium salts useful here can be represented by the following structural formula:

$$(R)_4P^+A^-$$

R in the above structural formula are organic moieties and can be alkyl groups such as methyl, ethyl, propyl, butyl, pentyl, and higher groups such as decyl, hexadecyl, etc. The alkyl groups can be straight chain or branched. The organic moieties represented by R can also be alkenyl. Examples include vinyl and allyl groups and other unsaturated groups having 2 or more carbon atoms, as high as 18 or more carbons, which have one or more unsaturated groups such as linolyl, linolenyl, etc. Also, alkynyl groups are represented. Examples include propargyl and other acetylenic unsaturated groups having 2 or more carbon atoms having one or more acetylenic groups. R can be represented by aryl moieties such as phenyl, naphthyl, anthracyl, diphenyl, etc. Also, substituted aryl such as $R'_n$-B- where B is an aryl group and R' is the substituted group, the maximum value of n is determined by the available substitutable groups on B. R' may be another aryl group, alkyl, cycloalkyl, alkenyl, alkynyl and substituted derivatives thereof. R can also be represented by cycloalkyl, cycloalkenyl and cycloalkynyl groups. Examples include cyclopentyl, cyclohexyl, cyclohexenyl and cyclohexynyl. Also, R can be represented by heterocyclic groups such as furfuryl, pyridyl and thiophenyl.

Any of the above groups may be substituted with non-carbon atoms such as oxygen, nitrogen, sulfur and halogen. Two or more of the R groups may be the same or each may be different.

The phosphonium salt can be a polymer which contains phosphonium salt groups, in which the phosphonium salt groups are pendant, such as, for example,

Polymer Backbone

-continued

The anion, $A^-$, of the onium salt is an anion of an acid which will not detrimentally attack the surface of the metal substrate being pretreated. By the expression "detrimentally attack" is meant an attack which will cause subsequent corrosion problems. Thus, halogen anions such as $Cl^-$ and $Br^-$ would, ordinarily, not be used because metal substrates which have been treated with phosphonium salts containing these anions rapidly corrode resulting in a loss of adhesion of a subsequently applied coating and in an unsightly appearance. Suitable anions are anions of weak acids such as weak organic acids, such as formate, acetate, propionate and lactate, and anions of other weak acids such as borate, carbonate and hydroxide.

Examples of the phosphonium salts are alkyl and mixed alkyl aryl phosphonium salts. Specific examples are ethyl triphenyl phosphonium acetate and tetrabutyl phosphonium acetate.

The amount of phosphonium salt present in the blend is at least 2 percent by weight based on the sum of the weight of the novel water-dispersible reaction product and the weight of the phosphonium salt. Generally, the blends comprise up to about 20 percent of the phosphonium salt. Preferably, the blends comprise from about 5 to about 10 percent of the phosphonium salt.

In preparing the blends, it is preferred that the phosphonium salt be introduced after the novel reaction product has been formed. While not desiring to be bound by any theory, it is desired to mention that the phosphonium salt catalyst (used in catalyzing the reaction of the epoxy material and the beta-diketone) could, in part or in whole, be in a form that could constitute an active component of the blend, that is, exert a corrosion-inhibiting effect. In such an instance, the catalyzing phosphonium salt, in part or in whole, would be included in the "at least 2 percent" by weight phosphonium salt that is blended with the water-dispersible novel reaction product. It is, therefore, believed that the phosphonium salt could be added to the reaction mixture if reaction conditions were carefully controlled.

In the practice of the present invention, aqueous compositions of the blends can be employed to impart corrosion resistance properties to metal, particularly ferrous metals. Preferably, the aqueous compositions are in the form of dispersions or solutions. The concentration of the blend in the aqueous dispersion can be critical. The concentration will probably vary depending on application. If the concentration is too low, insufficient protection may be obtained. If the concentration is too high, corrosion resistance may again suffer. At a lower concentration limit, the dispersion should contain at least about 1 percent by weight of the blend; the percentage by weight being based on total weight of the aqueous dispersion. In general, an upper limit of 20 percent can be recommended. Preferably, water constitutes at least 25, preferably at least 50 percent of the aqueous medium with the remainder, if any, being organic cosolvents.

The aqueous dispersions of the blend can be applied to the surface of the substrate in any convenient manner such as by immersion, spraying, or wiping the surface either at room temperature or at elevated temperature. When desirable, the aqueous dispersions can be cathodically electrodeposited on substrates without compromising either their effectiveness as corrosion inhibitors or the properties of latter applied coatings (whether electrocoated or not). It should be appreciated that when the latter applied coating is by electrodeposition, the treated substrate (by electrodeposition) is not completely insulating.

After the application, the metal article is dried, preferably with forced air. Ferrous metal articles treated with the blends of this invention have been found to display substantially improved good corrosion resistance properties. They can be exposed to the atmosphere without danger of atmospheric oxidation on the surface. After drying, the metal substrates can then be coated with a decorative or protective coating.

The blends can be formulated, in a combination, with curing agents, to provide compositions with additional properties. When formulated with curing agents, it is preferred that the novel compositions also contain active hydrogens which are reactive at elevated temperatures with a curing agent. Examples of active hydrogens are hydroxyl, thiol, primary amine, secondary amine (including imine) and carboxyl, with hydroxyl being preferred.

The curing agents are those which are capable of reacting with the active hydrogens to form a cross-linked product. Examples of suitable curing agents are phenolic resins, aminoplasts and blocked polyisocyanates which are preferred.

Suitable aminoplasts for use in the invention are described in U.S. Pat. No. 3,937,679 to Bosso et al in column 16, line 3, continuing to column 17, line 47, the portions of which are hereby incorporated by reference. As disclosed in the afore-mentioned portions of the U.S. Pat. No. 3,937,679, the aminoplast can be used in combination with methylol phenol ethers. The aminoplast curing agent usually constitutes about 1-60 and preferably 5-40 percent by weight of the resinous composition based on total weight of the acid-solubilized resinous vehicle and the aminoplast.

With regard to the capped or blocked polyisocyanate curing agents, these are described in U.S. Pat. No. 4,104,147, column 7, line 36, continuing to column 8, line 37, the portions of which are hereby incorporated by reference. Sufficient capped or blocked polyisocyanate is present in the coating system such that the equivalent ratio of latent isocyanate groups to active hydrogens is at least 0.1:1 and preferably about 0.3 to 1:1.

Aqueous compositions comprising the combination of the blend and a curing agent can be applied to the surface of the substrate in any convenient manner such as by immersion, spraying, or wiping the surface either at room temperature or at elevated temperature. When desirable, the aqueous compositions of the combination can be electrodeposited on a variety of substrates.

After the coating application, the substrate can be baked at temperatures such as 90° to 210° C. for about 1 to 30 minutes.

The aqueous compositions of the combination are suited for use on a variety of substrates. Films of appreciable build and hardness, having excellent appearance and substrate adhesion are obtained therefrom. It is noteworthy that the obtained films are corrosion resistant, particularly on ferrous metal substrates; they are solvent resistant also.

This and other aspects of the invention are further illustrated by the following examples. It is to be understood that the following examples and other aspects of the invention described herein are not intended to be limiting; rather, other equivalents of the invention are intended to be covered, as well. It is to be further understood that all percentage compositions expressed herein are parts by weight unless otherwise stated.

EXAMPLE I

This example illustrates the preparation of the novel composition of the present invention, and the quaternary ammonium salt derivative thereof. The following charge was used in the preparation:

| Ingredients | Parts by Weight (Grams) |
|---|---|
| EPON 1001* | 500.0 |
| 1,3-diphenyl-1,3-propanedione | 70.8 |
| 2-ethylhexanol | 70.0 |
| Ethyl triphenyl phosphonium acetate | 1.3 |
| Dimethylethanolamine lactate | 69.2 |
| Deionized water | 23.4 |
| Deionized water | 156.7 |

*EPON 1001 is a polyglycidyl ether of bisphenol A having an epoxy equivalent of about 500 and a molecular weight of about 1000, commercially available from Shell Chemical Company.

The EPON 1001, the diphenyl propanedione and the 2-ethylhexanol were charged to a properly equipped reaction vessel and heated under a nitrogen sparge for about an hour and twenty-five minutes, to a temperature of 92° C. The reaction mixture was allowed to cool, and at 32° C. the ethyl triphenyl phosphonium acetate (catalyst) was added. Thereafter, the reaction mixture was heated to 135° C.; there was an exotherm and a resulting temperature rise to 155° C. After a slight temperature drop to 151° C., the reaction mixture was heated to about 175° C. The temperature was maintained over the range of 170° to 175° C. for an hour to a Gardner-Holdt viscosity of E, measured as a 44 percent resin solids solution in 2-butoxyethanol at 25° C.

At 90° C., a solution of the dimethylethanolamine lactate in the first portion of water was introduced into the reaction vessel and the temperature was maintained over the range of 80°-90° C. for two hours. A clear brown solution was obtained which was thinned with the second portion of water. The resulting reaction product had a solids content of 72.5 percent.

The following illustrates the preparation of an electrodeposition bath using the quaternary ammonium salt group-containing polymer prepared as described above, use of the bath for electrodeposition of ferrous metal substrates, and the evaluation of the corrosion resistance of the coated substrates.

The electrodeposition bath was prepared by mixing at room temperature the following mixture of ingredients:

| Ingredients | Parts by Weight (Grams) |
|---|---|
| Quaternary ammonium salt group-containing polymer | 310.3 |
| Deionized water | 1190.0 |

The electrodeposition bath (15 percent resin solids) was then used to electrocoat iron phosphate pretreated steel substrates, zinc phosphate pretreated steel substrates, and untreated steel substrates. The substrates were electrocoated at standard electrocoating conditions. The coatings were baked and scribed with an "X" and then placed in a salt spray chamber at 38° C. (100° F.) at 100 percent relative humidity atmosphere of 5 percent by weight aqueous sodium chloride, for a period of 14 days. The coating and baking schedules, and the evaluation of the substrates in terms of the measurement of scribe creepage due to corrosion are reported in the examples of Table 1.

TABLE 1

| Substrate | Voltage at Which Electrocoated for 90 seconds at 80° F. (27° C.) | Appearance of Film After Baking at 350° F. (177° C.) for 30 minutes | Film Thickness in mils | Scribe Creepage (in mm.) |
|---|---|---|---|---|
| zinc phosphate pretreated steel | 200 | clear and glossy | 0.06–0.08 | 0.0 |
| zinc phosphate pretreated steel | 250 | " | 0.10–0.15 | — |
| iron phosphate pretreated steel | 250 | glossy | 0.3–0.5 | — |
| iron phosphate pretreated steel | 200 | " | 0.35 | 0.0 |
| untreated steel | 200 | glossy | 1.2 | 0.0–0.6 |
| " | 150 | " | 0.6 | — |
| zinc phosphate pretreated steel | 250 | " | 0.55 | — |
| untreated steel | 150 | " | 0.6 | — |

EXAMPLE II

The following illustrates the preparation of coating compositions comprising quaternary ammonium group-containing polymers formulated with crosslinkers, and the electrodeposition thereof.

| Ingredients | Parts by Weight (Grams) |
|---|---|
| Quaternary ammonium salt group-containing polymer of Example I | 310.03 |
| Crosslinker[1] | 65.0 |
| Catalyst paste[2] | 8.8 |
| Deionized water | 1390.0 |

[1] The crosslinker is a fully blocked 2,4-toluene diisocyanate which was prepared as follows: 2548.4 grams of 2-butoxyethanol was added to the toluene diisocyanate over a period of three hours and over a temperature range of about 21–29° C. Thereafter, the reaction mixture was maintained at a temperature range of 30 and 35° C. for 1 hour. The reaction mixture was then heated up to 65–76° C. and 965.5 grams of trimethylolpropane was added; there was an exotherm and a resulting temperature rise to 142° C. The reaction mixture was allowed to cool to about 130° C. within an hour, and then held at 90° C. for another hour. The reaction mixture was thinned with 3116.9 grams of 2-butoxyethanol.
[2] The catalyst paste was a dibutyltin oxide with a quaternized epoxy resin grinding vehicle.

The resinous composition, the crosslinker and the catalyst paste were blended under agitation followed by the addition of the deionized water. The resulting dispersion had a 15 percent resin solids content.

This dispersion was used to electrocoat various substrates at standard electrocoating conditions as reported in Table 2 below. The coatings were baked and the baked coatings were scribed with an "X" and subjected to salt spray corrosion testing as described in Example I. The coating and baking schedules and the evaluation of substrates in terms of the measurement of scribe creepage due to corrosion are reported in the examples of Tables 2 and 3.

TABLE 2

| Substrate | Voltage at Which Electrocoated for 90 seconds at 80° F. (27° C.) | Appearance of Film After Baking at 350° F. (117° C.) for 30 minutes | Film Thickness in mils |
|---|---|---|---|
| zinc phosphate pretreated steel | 200 | glossy | 0.3 to 0.4 |
| iron phosphate, pretreated steel | 200 | glossy | 0.45 to 0.5 |
| untreated steel | 150 | glossy | 0.9 to 1.0 |

TABLE 3

| Substrate | Voltage at Which Electrocoated for 90 seconds at 80° F. (27° C.) | Appearance of Film After Baking at 400° F. (204° C.) for 20 minutes | Film Thickness in mils |
|---|---|---|---|
| zinc phosphate pretreated steel | 200 | clear and glossy | 0.15 to 0.3 |
| untreated steel | 150 | clear and glossy | 1.2 to 1.5 |

EXAMPLE III

This example further illustrates the use of the quaternary ammonium salt group-containing polymers of the present invention as pretreatment agents for steel substrates.

The quaternary ammonium salt group-containing polymer was prepared in essentially the same manner as described in Example I and dispersed in deionized water to form a 10 percent resin solids dispersion.

Ferrous metal articles were dipped in the dispersion at room temperature for 2 minutes, blown dry with air, baked at 300° and 400° F. (149° and 204° C.) for 5 minutes and then coated with a thermosetting acrylic coating composition sold commercially by PPG Industries, Inc. under the trademark DURACRON 200. Coating was accomplished by drawing down to approximately 1 mil thickness with a draw bar. The coated sample was then baked for 10 minutes at 400° F. (204° C.), scribed with an "X" and placed in a salt spray chamber for salt spray corrosion testing as described in Example I.

For the purposes of comparison, there were evaluated control panels in the form of substrates which were dipped in an art-known pretreatment agent which is an onium salt comprising the reaction product of EPON 1001 and an acid salt of a tertiary amine (no beta-diketone moiety), and then coated with DURACRON 200 as described above.

TABLE 4

| Composition | Substrate | Scribe Creepage |
|---|---|---|
| *Test Panels* | | |
| Quaternary ammonium salt of novel composition (10% resin solids) | Untreated steel | 2.0 mm |
| Quaternary ammonium salt of novel composition (20% resin solids) | " | 2.5 mm |
| *Control Panels* | | |
| Quaternary ammonium salt of EPON 1001 (10% resin solids) | Untreated steel | 3.0 mm |
| Quaternary ammonium salt of EPON 1001 (20% resin solids) | " | 3.5 |

EXAMPLE IV

This example illustrates the improvement in the corrosion resistance properties obtained when the blends of the present invention comprising the phosphonium salts and the epoxy material-beta-diketone products are used.

15 percent by weight of an onium salt prepared essentially in the manner of Example I was blended with 2 percent by weight of ethyl triphenyl phosphonium acetate. The blend was dispersed in water to form a 17 percent resin solids dispersion.

In the manner of Example III, the dispersion was applied to the surface of ferrous metal substrates which were then evaluated for their corrosion resistance properties. The method of evaluation was as described in Example I and the results are reported in Table 5, below.

For the purpose of comparison, there were evaluated control panels in the form of ferrous metal substrates which were similarly treated with 15 percent dispersions comprising onium salts prepared essentially in the manner of Example I.

TABLE 5

| Pretreatment Agent | Substrate | Pretreatment Conditions | Salt Spray Results: Scribe-Creepage After | | | |
|---|---|---|---|---|---|---|
| | | | 96 hrs. | 240 hrs. | 336 hrs. | 408 hrs. |
| Quaternary ammonium salt group-containing polymer prepared in the manner of Example I (control) | Bare cold rolled steel (degreased) | Room temperature dipped for 2 minutes, drip-dried and baked at 400° F. (204° C.) for 5 minutes | 1.2 mm | 1.5 mm | 4.5 mm | 7.0 mm |
| The blend prepared in the manner of Example IV | Bare cold rolled steel (degreased) | Room temperature dipped for 2 minutes, drip-dried and baked at 400° F. (204° C.) for 5 minutes | 0.5 mm | 1.0 mm | 2.5 mm | 4.5mm |

While the illustrative embodiments of the invention have been described hereinabove with particularity, it will be understood that various modifications will be apparent to and can be readily made by those skilled in the art without departing from the scope or spirit of the invention. Accordingly, it is intended that claims directed to the invention be construed as encompassing all aspects of the invention which would be treated as equivalents by those skilled in the art to which the invention pertains.

Therefore, what is claimed is:

1. A composition of matter comprising the blend of:
   (A) a cationic group containing reaction product of:
   (i) an epoxy material; and
   (ii) a beta-diketone of the formula:

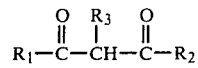

wherein $R_1$, $R_2$ and $R_3$, each independently, is a hydrogen or a hydrocarbyl group containing from about 1 to about 18 carbon atoms, selected from the group consisting of alkyl and aryl; and
   (iii) a precursor of a cationic group; with
   (B) at least 2 percent by weight, based on the total weight of (i) and (ii), of a monomeric or polymeric phosphonium salt which is different from (A).

2. The composition according to claim 1 wherein the precursor of the cationic group is an onium salt precursor which is an acid salt of a tertiary amine, a tertiary phosphine-acid mixture or a sulfide-acid mixture.

3. The composition according to claim 1 wherein the beta-diketone is 2,4-pentanedione, 2,4,-hexanedione, 2,4-heptanedione, 1-phenyl-1,3-butanedione, 1-phenyl-5,5-dimethyl-2,4-hexanedione, 1,3-diphenyl-1,3-propanedione, 1-cyclohexyl-1,3-butanedione, 1-(2-furyl)-1,3-butanedione, 3-keto butyraldehyde or propane dialdehyde.

4. The composition according to claim 3 wherein the beta-diketone is 2,4-pentanedione or 1-phenyl-1,3-butanedione.

5. The composition according to claim 4 wherein the beta-diketone is 1-phenyl-1,3-butanedione.

6. The composition according to claim 1 wherein the epoxy material is selected from the group consisting of epoxy-containing polyethers, polyesters, acrylics and urethanes.

7. The composition according to claim 6 wherein the epoxy material is a polyglycidyl ether of cyclic polyols or epoxy-containing acrylic polymers.

8. An aqueous dispersion comprising the composition of claim 1.

9. An aqueous dispersion of claim 8 comprising 1 to 20 percent by weight of the reaction product (A); the percentage by weight being based on total weight of the aqueous dispersion.

10. A composition of claim 1 wherein the phosphonium salt is an alkyl, an aryl or a mixed alkyl-aryl phosphonium salt.

11. A composition of claim 10 wherein the phosphonium salt is an ethyl triphenyl phosphonium acetate or a tetrabutyl phosphonium acetate.

12. A method of providing improved corrosion resistance to ferrous metal substrates comprising the steps of:

(A) applying to the surface of the substrate an aqueous dispersion containing a blend of:
  (i) the reaction product of:
    (a) an epoxy material;
    (b) a beta-diketone of the formula:

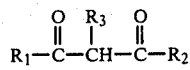

wherein $R_1$, $R_2$ and $R_3$, each independently, is a hydrogen or a hydrocarbyl group containing from about 1 to about 18 carbon atoms, selected from the group consisting of alkyl and aryl; and
    (c) an onium salt precursor which is an acid salt of a tertiary amine, a tertiary phosphine-acid mixture or a sulfide-acid mixture; with
  (ii) at least 2 percent by weight, based on the total weight of (a) and (b), of a monomeric or polymeric phosphonium salt which is different from (i) followed by
(B) directly coating the surface with a coating material.

13. A method of claim 12, which is by cationic electrodeposition.

14. A ferrous metal article obtained by the method of claim 12.

15. A ferrous metal article obtained by the method of claim 13.

16. An aqueous composition comprising:
(A) the blend of:
  (i) the reaction product of:
    (a) an epoxy material;
    (b) a beta-diketone of the formula:

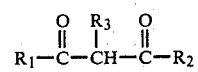

wherein $R_1$, $R_2$ and $R_3$, each independently, is a hydrogen or hydrocarbyl group containing from about 1 to about 18 carbon atoms, selected from the group consisting of alkyl and aryl; and
    (c) an onium salt precursor which is an acid salt of a tertiary amine, a tertiary phosphine-acid mixture or a sulfide-acid mixture; with
  (ii) at least 2 percent by weight, based on the total weight of (a) and (b), of a monomeric or polymeric phosphonium salt which is different from (i)
(B) a curing agent selected from the group consisting of aminoplasts, blocked isocyanates, phenoplasts and mixtures thereof.

17. A composition of claim 16 wherein the curing agent is a blocked isocyanate.

18. A method of electrocoating an electrically conductive surface serving as a cathode which comprises passing an electric current between said cathode and an anode immersed in an electrodepositable aqueous dispersion of claim 16 or 17.

* * * * *

UNITED STATES PATENT AND TRADEMARK OFFICE
CERTIFICATE OF CORRECTION

PATENT NO. : 4,321,304

DATED : March 23, 1982

INVENTOR(S) : Nicholas T. Castellucci

It is certified that error appears in the above-identified patent and that said Letters Patent are hereby corrected as shown below:

Column 9, line 43, "310.03" should be --310.3--.

Column 10, line 6, "(117°C.)" should be --(177°C.)--.

Column 11, line 13, "3.5" should be --3.5 mm--.

Signed and Sealed this

Twenty-second Day of June 1982

[SEAL]

Attest:

GERALD J. MOSSINGHOFF

Attesting Officer

Commissioner of Patents and Trademarks